Figure 1:
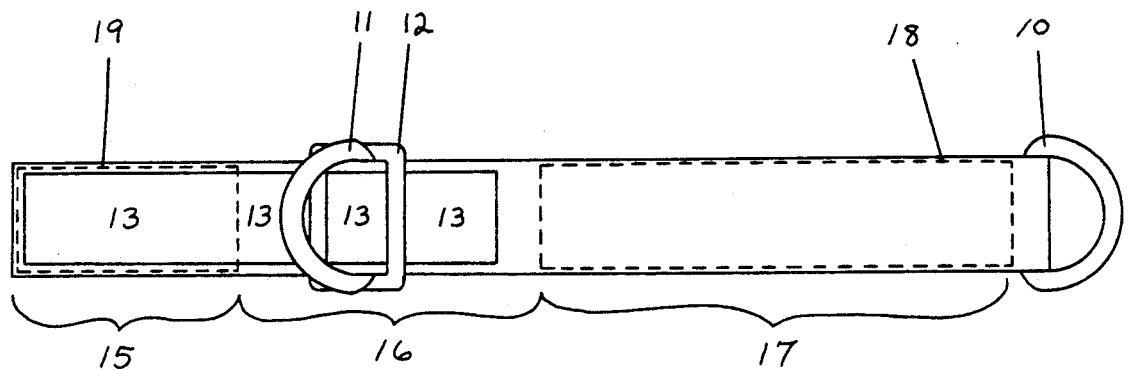

United States Patent [19]

Gurski, Jr.

[11] Patent Number: 5,050,538
[45] Date of Patent: Sep. 24, 1991

[54] BREAK-AWAY PET COLLAR

[76] Inventor: John A. Gurski, Jr., 625 Cheswick Rd., Philadelphia, Pa. 19128

[21] Appl. No.: 521,906

[22] Filed: May 11, 1990

[51] Int. Cl.$^5$ ............................................. A01K 27/00
[52] U.S. Cl. .................................... 119/106; 119/110
[58] Field of Search ................... 119/106, 109, 110; 24/31 B, 31 V, 32, 165, 197, 306

[56] References Cited

U.S. PATENT DOCUMENTS

| | | | |
|---|---|---|---|
| 3,995,598 | 12/1976 | Gardner et al. | 119/106 |
| 4,044,725 | 8/1977 | Miller | 119/106 |
| 4,180,016 | 12/1979 | George | 119/106 |
| 4,426,957 | 1/1984 | Horrigan | 119/110 X |
| 4,762,088 | 8/1988 | Chapman et al. | 119/106 |
| 4,787,340 | 11/1988 | Kirtley | 119/106 |
| 4,881,492 | 11/1989 | Jones | 119/106 |
| 4,917,049 | 4/1990 | Peterson | 119/106 |
| 4,924,815 | 5/1990 | Halla | 119/106 |

FOREIGN PATENT DOCUMENTS

| | | | |
|---|---|---|---|
| 2334289 | 7/1977 | France | 119/106 |
| 8501857 | 5/1985 | PCT Int'l Appl. | 119/106 |
| 0278477 | 10/1927 | United Kingdom | 119/106 |
| 0831822 | 3/1960 | United Kingdom | 119/106 |

*Primary Examiner*—Robert P. Swiatek
*Assistant Examiner*—Todd E. Manahan

[57] ABSTRACT

An animal collar which fastens in two different ways. First the collar can be fastened with VELCRO strips to allow an animal wearing the collar to escape from it by the use of force should the animal acccidentally become snared by the collar. The second fastening involves the use of D-rings to hold the collar securely on the animal's neck and prevent the animal from removing the collar with force when the animal is being held on a leash or rope. The collar is adjusted by moving one of the D-rings along the length of the collar and securing it with a clip.

5 Claims, 2 Drawing Sheets

BREAK-AWAY PET COLLAR

BACKGROUND—FIELD OF INVENTION

This invention relates to pet collars, specifically to a pet collar that will allow an animal wearing it to free itself if accidentally ensnared.

BACKGROUND—DISCUSSION OF PRIOR ART

The standard animal collar is used to restrain an animal from escaping whether it is on a rope or on a leash. Such a collar cannot be removed by the animal under most normal circumstances. Although this facilitates controlling the animal, the disadvantage of this type of collar is that the collar will not release an animal if the animal is accidentally snared on something. An animal can become ensnared permanently whether in a woods or on a fence, etc., and, if human help is not available, will eventually die.

Any pet owner who has had a collared animal escape appreciates the danger of accidental snaring. But up until now there was no alternative. It would be far worse to have an uncollared animal escape without the benefit of the identification carried on its collar. Pet owners have had to take the risk of accidental snaring with their escaped or wandering pets.

OBJECTS AND ADVANTAGES

Several objects and advantages of this invention are:
(a) to provide an animal collar which allows the animal to be held securely, whether on a leash or rope, etc.;
(b) to provide an animal collar which allows the animal to free itself if caught accidentally;
(c) to provide a collar that can be made in a variety of strengths to allow the strongest or weakest animal to escape if accidentally caught;
(d) to provide a collar that can be made or adjusted to any animal's size from the smallest to the largest;

Further objects and advantages of this invention are that the lives of many pets could be saved by allowing the animal wearing the collar to escape if accidentally caught. Any pet owner who has had a pet escape while wearing a collar would welcome the knowledge that an accidental snaring, only one of the many evils that can befall a wandering pet, would be prevented. At the same time the collar allows the animal's owner the security of knowing that the animal carries identification on its collar should the animal become lost. Thus the collar not only adequately serves the original function of animal collars, it also adds many very valuable benefits to the original concept.

Further objects and advantages will become apparent from a consideration of the ensuing description and drawings.

DRAWING FIGURES

FIG. 1: Opened collar, outer side-worn away from the animal's neck.

Figure 2:
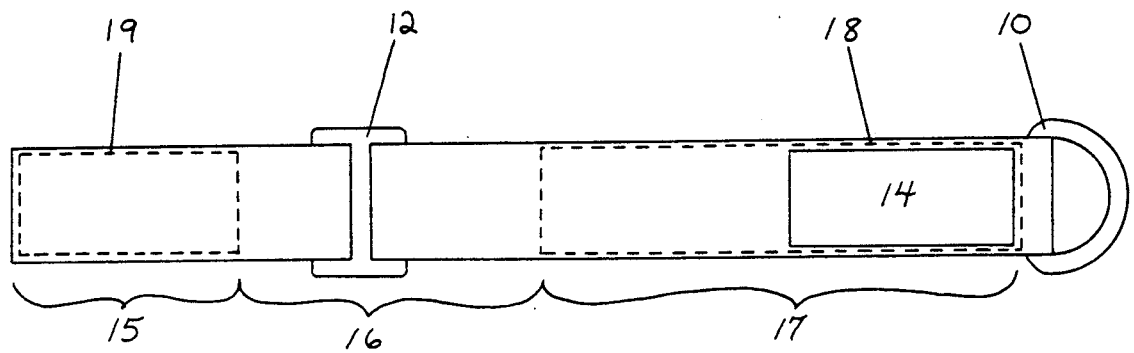

FIG. 2: Opened collar, under side-worn toward the animal's neck.

Figure 3:
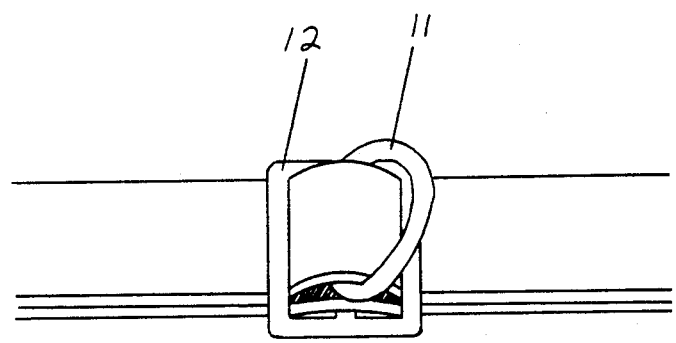

FIG. 3: Close-up view of adjustable slide and D-ring assembly, which allows the collar to be adjusted to fit the animal's neck.

Figure 4:
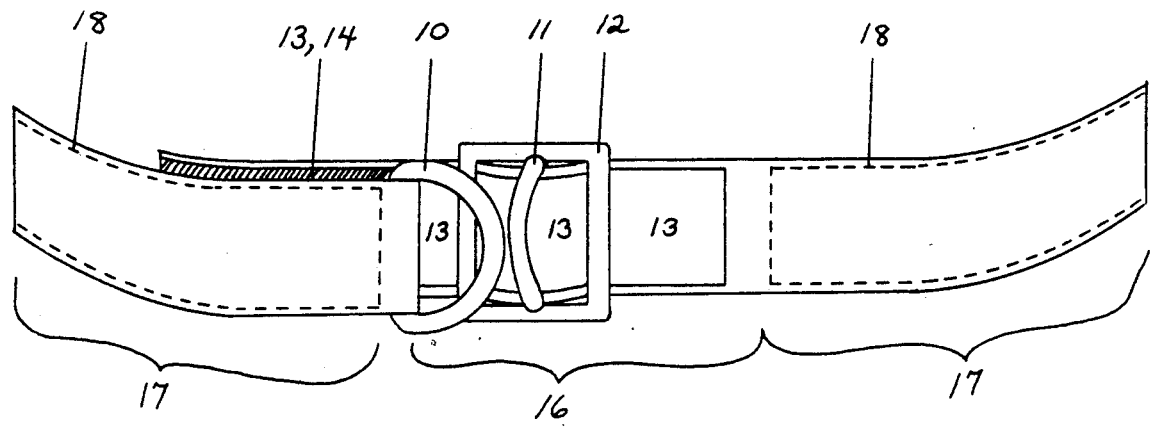

FIG. 4: Outer side of collar as it appears when fastened on the animal's neck.

Figure 5:
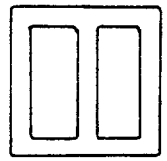

FIG. 5: Slide used to secure adjustable D-ring in the adjustable slide and D-ring assembly.

Figure 6:
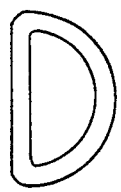

FIG. 6: D-ring used at both ends of collar.

REFERENCE NUMERALS IN DRAWINGS

10—D-ring on end of collar.
11—D-ring secured by slide in collar.
12—Slide.
13—VELCRO-soft, loop side.
14—VELCRO-hook side.
15—Doubled webbing sewn together at end of collar where D-ring is not located.
16—Doubled webbing not sewn together.
17—Doubled webbing sewn together at end of collar where D-ring is located.
18—Stitching holding end D-ring in place.
19—Stitching on end of collar where D-ring is not located.

DESCRIPTION OF INVENTION

FIG. 1 shows the top view of the opened collar, which is worn away from the animal's neck. On this side of the collar are the two D-rings 10, 11, and one of the strips of VELCRO 13. (VELCRO, Patented 1955, U.S. Pat. No. 2,717,437, Company: Velcro S.A., Switzerland. Also: Patented 1961, U.S. Pat. No. 3,009,235, Company: Velcro Company, Switzerland) The dimensions of all aspects of the collar, the VELCRO and the attached hardware, are all variable, depending upon the size of the collar and the size and strength of the animal it is meant to fit. FIG. 2 shows the underside of the opened collar, the side worn toward the animal's neck. On this side is the other strip of VELCRO 14, and the end D-ring 10 is still apparent. FIG. 3 is a close-up view of the D-ring/slide 11/12, assembly, indicating how the webbing is strung through the slide 12 to hold the D-ring 11 securely, and still offer the ability to adjust the placement of the D-ring 11 along the collar. Individual views of the D-rings 10 and 11 and the slide 12 can be seen in FIGS. 6 and 5 respectively. FIG. 4 shows the correct method of fastening the collar around the animal's neck. The VELCRO 13, 14 is closed, holding the collar in place, and the D-rings 10, 11 are located next to each other in the proper way to facilitate fastening the D-rings 10, 11 together to hold the animal securely without the danger of the "break-away" feature working.

The collar can be made from nylon webbing, leather, or any similar penetrable material that would be appropriate for an animal collar. The collar wraps around the animal's neck and is secured by two strips of VELCRO 13, 14 located on opposite ends and sides of the collar. Any fastening or loop and hook connector that would permit a release of the collar through force could be used in place of the VELCRO, but for purposes of this application VELCRO is the fastening of choice. The length of the VELCRO will vary depending upon the strength of the VELCRO and the length of the collar. The VELCRO strips run along the collar and secure such that the collar lies flat against the animal's neck. At one end of the collar is a metal D-ring 10. Another D-ring 11 is attached to the collar a short distance from the other end of the collar, and is adjustable by means of a metal slide 12. This serves as the adjustment to fit a particular animal's neck. Such an adjustment could be accomplished in a number of ways, but the D-ring/slide 11/12 assembly was chosen for this application.

The collar is secured on an animal by use of the VELCRO fasterners. The animal can then be secured on a leash, rope or other restraining device by fastening both D-rings 10, 11 together through the leash's snap hook or similar fastener. Once fastened in this fashion, the D-rings will prevent the collar from tearing off the animal's neck even if force is applied.

Manufacture of the collar is done as follows: The collar is made from a double layer of webbing or other suitable material. The webbing's width is dependent upon the size of the collar, and the length is cut twice as long as the length of the finished collar. A D-ring 10 is strung onto the webbing and placed in the exact middle of the webbing's length. The webbing is doubled onto itself and fastened together 17 with stitching 18 holding the D-ring 10 securely in place at what is now one end of the collar. The webbing is stitched together along part of the collar's length. The length of the doubled webbing that is stitched together varies, depending upon the length of the finished collar, and extends to within a short distance of the other end of the collar. Another D-ring 11 and a slide 12 to secure the D-ring 11 are then slipped onto the webbing in the following fashion: both sides of the doubled webbing 16 are slipped through one side of the slide 12 from the back of the slide 12 to the front. Then the D-ring 11 is strung onto the top layer of webbing, and, finally, both layers of webbing 16 are pushed through the other side of the slide 12 to the back of the slide 12. In the area where this slide 12 and D-ring 11 are attached, the double layer of webbing is not stitched together 16 in order to allow adjustment of the D-ring 11 and also serve as adjustment for the collar length. Strips of VELCRO 13, 14 are then sewn to opposite ends of the collar-the soft, loop side of the VELCRO 13 is sewn to the outer side of the collar at the end where the D-ring 11 and slide 12 assembly are. The soft side of the VELCRO is used here because the D-ring/slide 11/12 assembly may have to slide over it to adjust the collar properly. The hook side of the VELCRO 14 is sewn to the under-side of the collar at the end where the D-ring 10 is located. Finally, the ends of the webbing 15 are fastened together with stitching 19.

There are other means of accomplishing the same end result that this collar achieves. Instead of using VELCRO as the fastener that can be released by force, any similar fastener that would allow an animal to free itself from its collar through the use of force could be utilized. Also, any device that would allow adjustment of the collar to fit an animal's neck could be used in place of the slide/D-ring assembly. This would include any device that would allow the D-ring to be moved at will, but held firmly when the collar was in use. And the collar's function is not contingent upon the use of D-rings per se. Any type of ring or clip could be used to achieve the same end.

In addition, the means of fastening the collar securely on a leash, etc., could be done a number of ways, including having the ring on one end of the collar slip through a slightly larger ring located on the other end of the collar, the smaller ring then being fastened to the snap hook of the leash, or a rope, etc.

OPERATION

To use this invention, first the collar must be adjusted to the size of the animal's neck. An indefinite number of different sized collars could be produced, and the appropriately-sized collar would then be selected by the consumer. A minor size adjustment of approximately 2 to 3 inches is made by the consumer, using the D-ring/slide 11/12 assembly that can be clearly seen in FIG. 3. To do this the top or outer layer of webbing, which is worn away from the animal's neck, is pushed under one side of the slide 12 to loosen the D-ring 11 that is held by the slide. The D-ring 11 and slide 12 are then moved one way or the other along the webbing until the D-ring 11 is in the correct position for the collar to fit the animal for whom it is intended. The webbing is then pulled back tightly through the slide 12 to once again hold the D-ring 11 securely in place. To fit the animal correctly, the D-rings 10, 11 should be located side by side when the collar is fastened on the animal's neck with the VELCRO strips 13, 14. Once the collar is adjusted to fit the animal, the collar can be attached to the animal's neck by means of the two VELCRO strips 13, 14 located on opposite ends and sides of the collar. The collar should be attached such that the collar lies flat against the animal's neck, and the two D-rings 10, 11 are located next to each other as can be seen in FIG. 4 which shows the collar as it would appear when fastened on the animal's neck. When fastened by the VELCRO strips 13, 14 alone in this fashion the collar is in its "break-away" configuration. If the animal were to accidentally catch the collar on something, the animal can free itself by the use of force, tearing the VELCRO fastener open. At the same time the collar serves as a place to carry identification should the animal become lost.

To convert the collar and prevent the "break-away" feature from operating, the two D-rings 10, 11 on the collar, which should be located next to one another when the collar is properly in place on the animal, are fastened together. This can be done by any means, most commonly with the snap hook of a leash, or tied together by a rope, etc. When the two D-rings 10, 11 are held together in this fashion the collar operates in the standard conventional fashion of an animal collar, and the animal cannot escape the collar by use of force.

SUMMARY, RAMIFICATIONS, AND SCOPE

Thus it is evident that the break-away feature of this collar can provide valuable features, not included in the standard animal collar. As with the standard collar an animal can be secured by the collar when the owner so desires. The collar also serves as a way to identify the animal should the animal become lost. But if the animal becomes snared by the collar during its wanderings, the animal can free itself by forcefully unfastening the VELCRO fastening of the collar.

Although the description above contains many specificities, these should not be construed as limiting the scope of the invention but as merely providing illustrations of some of the presently preferred embodiments of this invention. For example, D-rings are not the only hardware that could be used to secure the collar on the animal, but were merely selected as the most convenient in the examples given. Webbing would not have to be doubled to have a functioning collar, and many other materials are suitable for manufacturing collars besides webbing.

Thus the scope of the invention should be determined by the appended claims and their legal equivalents, rather than by the examples given.

What is claimed is:

1. A safety release pet collar comprising:

a flat strip of flexible material doubled back upon itself along its width and secured together by fastening means so as to form a one-piece band of two layers of said flexible material having a closed loop at one end;

said fastening means passing through both layers of flexible material and located along portions of the band adjacent both ends;

a first ring fixedly retained in said closed loop;

an opening formed between said layers of flexible material where said layers are not secured together, said opening located between the fastened portions of the band;

a second ring retained in said opening and movable therein;

a slide for restraining the movement of said second ring; both layers of flexible material passing through said slide and said slide being located along said opening, beneath said second ring; and cooperating force-release connectors at each end of the band, said connectors comprising strips of hook-and-loop material;

whereby, the ends of said band are fastened together by said strips of hook-and-loop material to encircle a pet's neck and upon application of extensive force to the band, said strips of hook-and-loop material are separated from one another, releasing the ends of the band, thus freeing the collar from the pet;

and whereby, when the ends of the band are fastened together by said strips of hook-and-loop material, the first and second rings are positioned adjacent each other so as to enable a snap hook at the end of a leash to be and-loop material;

and whereby, said slide and said second ring cooperate to form a means for adjusting the size of the collar to accommodate different sized pets.

2. The invention as defined in claim 1 wherein:
the said rings have a configuration substantially of a capital letter D.

3. The invention as defined in claim 1 wherein:
the fastening means comprises rows of stitching.

4. The invention as defined in claim 1 wherein:
the force-release connectors are disposed on opposite ends and sides of the band.

5. The invention as defined in claim 1 wherein:
(a) the slide has the configuration substantially of two adjoining rectangles that share one long side in common.

* * * * *